(12) United States Patent
Schmidt

(10) Patent No.: US 6,190,095 B1
(45) Date of Patent: Feb. 20, 2001

(54) INSERT SECURING DEVICE

(76) Inventor: Erik Schmidt, Rödhakevägen 12A, S-756 52 Uppsala (SE)

( * ) Notice: Under 35 U.S.C. 154(b), the term of this patent shall be extended for 0 days.

(21) Appl. No.: 09/297,642
(22) PCT Filed: Nov. 5, 1997
(86) PCT No.: PCT/SE97/01851
   § 371 Date: May 5, 1999
   § 102(e) Date: May 5, 1999
(87) PCT Pub. No.: WO98/22245
   PCT Pub. Date: May 28, 1998

(30) Foreign Application Priority Data

Nov. 15, 1996 (SE) .................................................. 9604192

(51) Int. Cl.⁷ .................................................. B26D 1/00
(52) U.S. Cl. .......................... 407/104; 407/102; 407/105
(58) Field of Search .................................. 407/104, 103, 407/109, 105, 110, 102

(56) References Cited

U.S. PATENT DOCUMENTS

| | | |
|---|---|---|
| 1,629,667 | 5/1927 | Knipple . |
| 3,662,444 * | 5/1972 | Erkfritz .............................. 407/104 X |
| 3,812,547 * | 5/1974 | Reich ................................. 407/120 X |
| 3,913,197 | 10/1975 | Wolf . |
| 3,965,553 * | 6/1976 | Faber .................................... 407/104 |
| 3,996,651 * | 12/1976 | Heaton et al. ........................ 407/104 |
| 4,364,693 * | 12/1982 | Lindsay ................................ 407/104 |

FOREIGN PATENT DOCUMENTS

| | | |
|---|---|---|
| 1602793 | 4/1970 | (DE) . |
| 3305832 | 8/1984 | (DE) . |
| 1218508 | 5/1960 | (FR) . |
| 0994133 * | 1/1983 | (SU) .................................... 407/104 |
| 1207639 * | 1/1986 | (SU) .................................... 407/104 |

* cited by examiner

Primary Examiner—Henry Tsai
(74) Attorney, Agent, or Firm—Young & Thompson

(57) ABSTRACT

A cutting insert toolholder for easy indexing in areas of limited access. In an outer end of the toolholder runs a through channel in which a bent bolt is inserted. The channel extends through the toolholder and is open at an outer end of the toolholder.

4 Claims, 4 Drawing Sheets

INSERT SECURING DEVICE

TECHNICAL FIELD OF THE INVENTION

This invention relates to cutting tools with removable inserts, such as indexable inserts, for use in turning and milling operations, and more specifically to cutting tools with insert attachment of a so called screw clamping type.

PRIOR ART

There is a wide range of various designs present wherein an indexable insert is secured in a toolholder by the use of a screw or a modified bolt. Common to these designs is that the screw, or the modified bolt, is inserted in a thread cutted in a toolholder, directly of via another threaded means.

A problem with a design of this type is that the screw or the bolt has to be completely unscrewed in order for the insert to be detached. This means, among others, that there is a risk that some of these articles, which usually are of small size, will be lost.

Another problem occurs in situations where accessibility, due to the attachment of the cutting tool in the operating machine, is limited.

Securing or detaching of the insert in such situations may necessitate the detachment of the complete cutting tool from the machine, in order to index the insert in a more spacious location. This operation is time consuming.

Thereafter, when the cutting tool is returned in place in the machine it has to be carefully calibrated to ensure a proper working position, which results in further losses of time.

SUMMARY OF THE INVENTION

The object of the present invention is to solve the problems above.

According to the invention, the insert is secured in the toolholder by the use of a specially designed bolt, said bolt being fitted into an open channel running across an outer end of the toolholder. The bolt is secured in place by a nut due to a tapered portion of said nut that after tightening is in engagement with a corresponding recess in the channel. The tightening also provides a securing force on the insert attached by the bolt.

The invention allows the insert as well as the nut to be attached to the bolt during securing or detaching, thereby eliminating the risk of losing separate articles.

Further, the assembly formed in this manner may easily be inserted into the channel of the toolholder without any need to detach the toolholder, substantially independent of how the toolholder is mounted in the operating machine. Since there is no need to unfasten the toolholder, and the insert at the same time can be fitted to the proper position with high accuracy, calibration is not necessary after indexing.

By the use of a slightly bent bolt the bend can be utilized as counterstay when wrenching the nut, at the same time as a resilient bias is achieved.

DETAILED DESCRIPTION OF EMBODIMENTS

Figure 1:
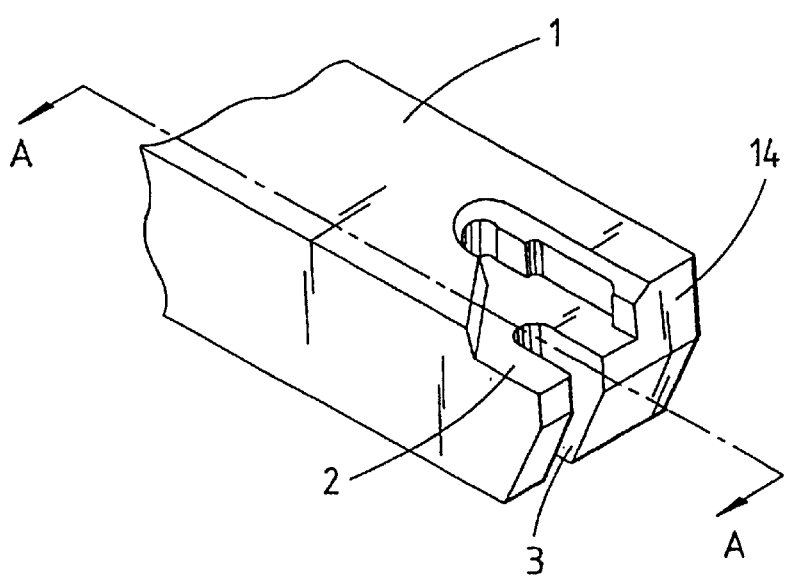
FIG. 1 is a perspective top view of a toolholder according to the invention.

FIG. 1 illustrates an embodiment of a toolholder 1 according to the invention having a recess formed to provide an insert seat 2 adapted for a predetermined insert. A channel 3 that is open toward the outer end 14 of the toolholder runs from the insert seat 2 through the toolholder to the bottom side of said toolholder.

Figure 2:
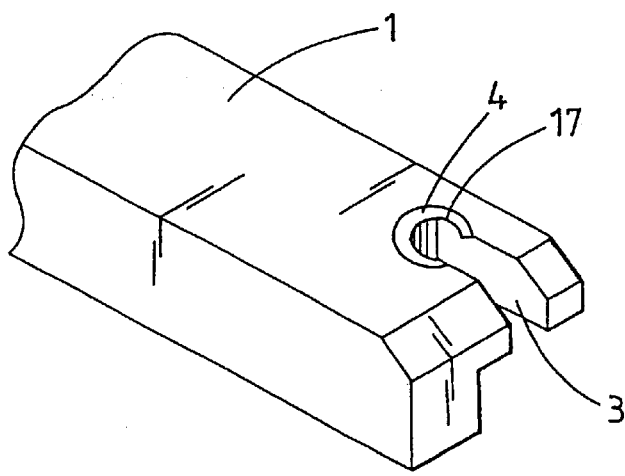
FIG. 2 is a perspective bottom view of the toolholder of FIG. 1.

FIG. 2 shows the toolholder of FIG. 1 from underneath. It is thereby shown that the channel 3 ends in a substantially tapered recess 4.

Figure 3:
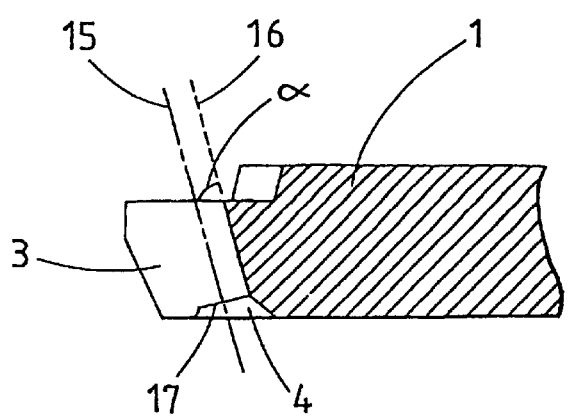
FIG. 3 is a cross sectional view taken along the line A—A of FIG. 1.

The shape of the channel is more clearly illustrated in FIG. 3, said figure showing a cross section along the line A—A of FIG. 1. According to FIG. 3 a line 16, parallel to the bottom of the channel, intersects the bottom plane of the insert seat 2 at an angle a <90°. Therefore, the tightening force from a bolt disposed in the channel, as will be disclosed below, will be introduced aslant into the insert, thereby urging said insert downwards against the bottom of the insert seat as well as backwards toward the farther portion of the insert seat.

The central axis 15 of the tapered recess 4 is parallel to the line 16. Further, the minimum diameter 17 of the tapered recess 4 is entirely within the bottom surface plane of the tool holder 1. This is also substantially valid for that imagined section of the diameter 17 that is located within the channel 3. In this way a recess is formed that fixates a tightened nut laterally, as will be described in the following.

Figure 4:
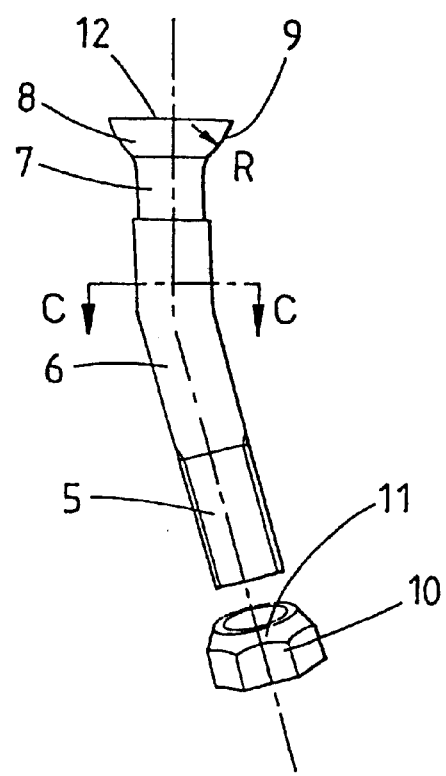
FIG. 4 is a side elevation view of a bolt, with a nut, according to a first embodiment of the invention.
Figure 5:
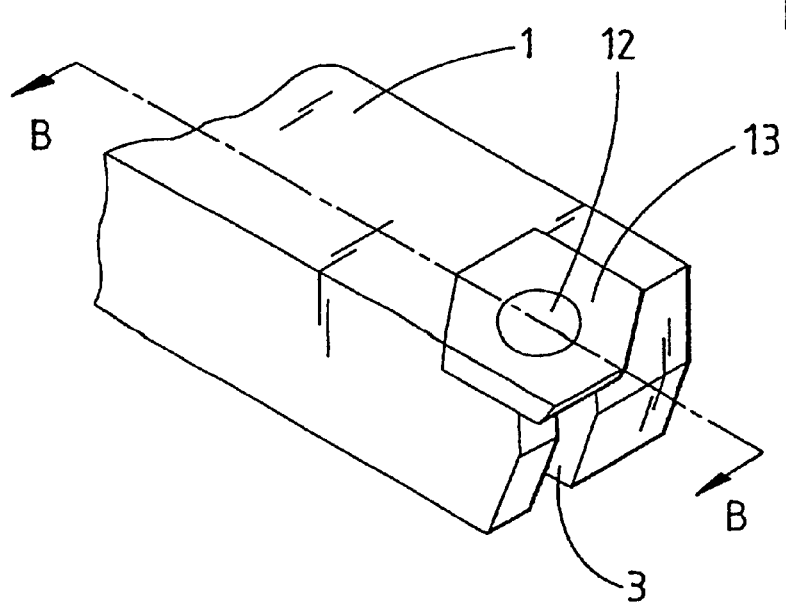
FIG. 5 is a perspective view of a tool holder, according to FIG. 1, including a mounted insert.

FIG. 4 shows an embodiment of a bolt according to the invention and a corresponding nut 10. In the present embodiment, the bolt has a length of 12 mm, and a threaded end section 5 of the bolt is provided with a M2.5 thread.

The top end of the bolt 19 is provided with a head 8. The end surface 12 of the head is preferably completely even, while the shell surface 9 is provided with a radius R. The bolt head 8 is joined to a slender portion 7 adapted to ensure clearance with regard to the hole in the insert, since the bolt during tightening will lean somewhat.

The bolt 19 has further an intermediate portion 6 so bent that the central axis of the threaded section 5 deviates from the central axis running through the head 8. In the present embodiment the deviation is 15°. The bent portion 6 contributes to a reliable securing, which is described in the following, but does also provide a counterstay when wrenching the nut 10 since the thereby occurring torsional moment urges the bend of the bolt against one of the sides of the channel. Additionally, at full tightening the bend of the bolt will act as a spring, thereby providing a bias that is advantageous in situations where the working piece vibrates with regard to the insert.

Figure 8A:
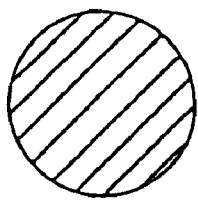
FIGS. 8A and 8B are cross sectional views of two variants of a bolt of the first embodiment of the invention, taken along the line C—C of FIG. 4.
Figure 8B:
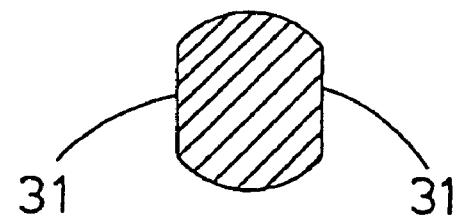

The intermediate portion 6 may have a cross section of any applicable shape. Thereby, a circular circumference represents a variant exhibiting favorable manufacturing costs, as illustrated in FIG. 8a. However, the best mode is assumed to be a modified circular shape with two diametrically opposed substantially plane surfaces, as illustrated in FIG. 8b. In this best mode the plane surfaces 31 are so oriented that a perpendicular to any of these surfaces is substantially parallel to the imaginary axis around which the portion 6 has been bent.

Therefore, in the mode as illustrated in FIG. 8b, when the bend of the bolt acts as a counterstay during tightening, the point of contact between the bolt and the side of the channel is displaced outwardly from the bottom of the channel, as compared to the case of a bolt with circular cross section. Consequently, the bolt can act more efficiently as a counterstay. At the same time, as the bolt has a reduced diameter when measured across a diameter parallel to the imaginary axis around which the intermediate portion 6 has been bent, the channel may be made more narrow which in turn allows for improved strength of the toolholder.

Figure 6:
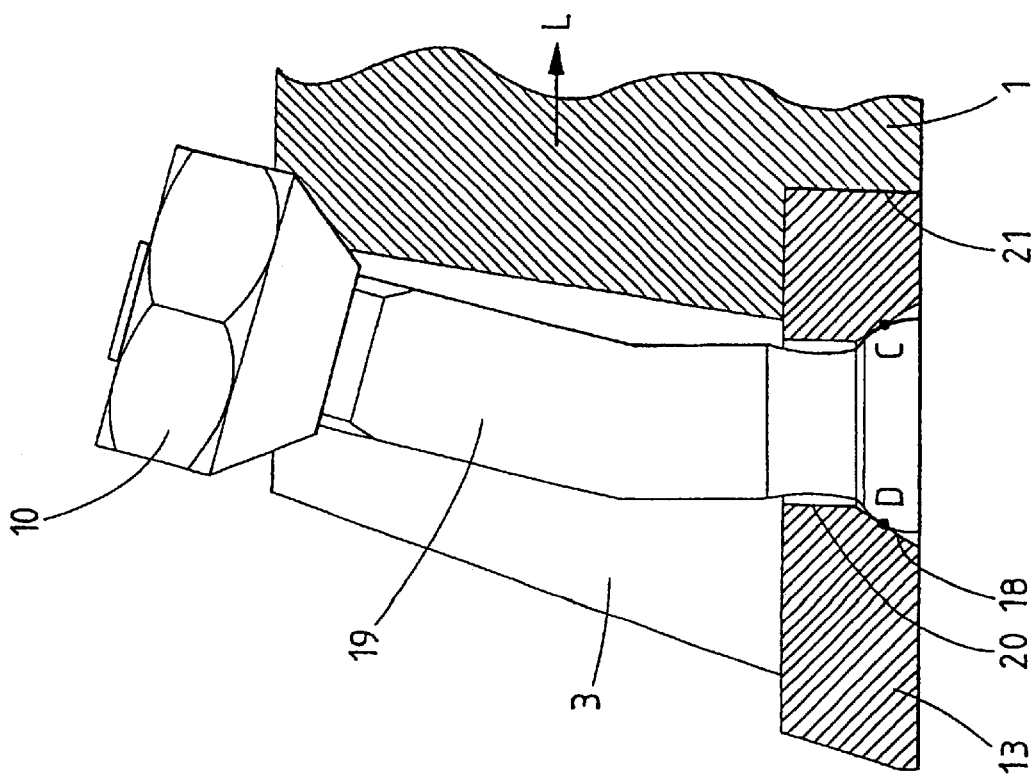
FIG. 6 is a cross sectional view taken along the line B—B of FIG. 5, including a mounted bolt of a first embodiment.

FIG. 6, that shows a cross section of a cutting tool with a secured insert 13, illustrates that the insert is provided with a through hole 20, said hole at at least one end being provided with a tapered bevel 18.

During assembly the bolt 19 is inserted though the hole 20 so that the shell surface 9 gets in contact with the tapered bevel 18. The nut 10, with its tapered portion 11 pointing towards the bolt head 8, is wrenched some turns on the thread 5 of the bolt 19, and the assembly is thereafter fitted into the channel 3 of the toolholder 1 in such a manner that the bend of the bolt is pointing outwardly from the bottom of the channel, the insert 13 is properly positioned in the insert seat 2 and the nut 10 is collinear to the tapered recess 4. The present embodiment is so shaped that erroneously mounting will be managed only with great difficulty.

Next, the nut 10 is tightened while the bent portion 6 of the bolt 19 provides a counterstay. Due to this the central axis through the head 8 will substantially be perpendicularly directed towards the insert and the main plane of the insert seat, resulting in that the insert is urged towards the bottom of the insert seat 2 with a suitable force.

However, at the final tightening, since the nut 10 due to the bend of the bolt is inclined with regard to the central axis through the bolt head 8, the load distribution will be somewhat uneven in the bevel 18. In a surrounding to point C of FIG. 6 the introduced load will be higher than in an area surrounding point D in said figure. Those load components in the surrounding of C that are directed parallel to the longitudinal direction of the toolholder, the arrow L of FIG. 6, will thereby become larger than the corresponding opposite components in the surrounding D. Consequently, the insert 13 will be urged also towards the inner wall 21 of the insert seat, ensuring that the insert is laterally fixed in place.

At tightening, the tapered portion 11 of the nut 10 joins with the tapered recess 4 in the channel 3, restraining the nut from moving laterally. Thereby is also ensured a secure attachment of the complete assembly.

Dismounting of the insert is made inversely.

Figure 7:
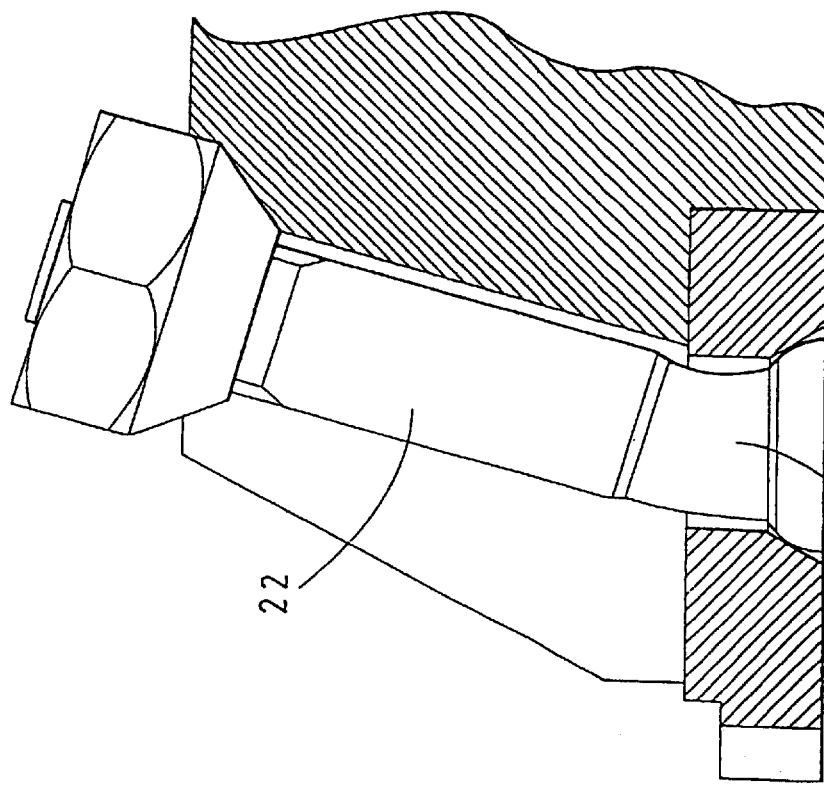
FIG. 7 is a cross sectional view taken along the line B—B of FIG. 5, including a mounted bolt of a second embodiment and an insert for parting.

A second embodiment is illustrated in FIG. 7. This second embodiment differs from the first in that the bent portion 23 of the bolt 22 is integrated with the slender portion 7, described with the first embodiment. In FIG. 7 is also, by showing an insert for parting, illustrated the possibility to utilize different types of inserts.

The second embodiment provides the possibility to manufacture the holder at lower cost, since the precision requirements on the channel 3 are lower. The operation coincides with that of the first embodiment apart from that, in the second embodiment, it is the wall of the hole in the insert that acts as a counterstay when wrenching the nut, while in the first embodiment the wall of the channel through the toolholder provides the counterstay.

In addition to the embodiments described above there are many possibilities to make minor deviations to adapt the invention to required machining conditions. For example, measures and shape of the tapered portion of the nut, the recess for this nut, the cross section of the bolt, the bolt head, the hole and bevel of the insert as well as the channel of the toolholder may be changed within the scope of the invention. Further, the design of the insert seat can be adapted to suit each required type of insert and machining.

Independent of the embodiment chosen, the present invention allows the toolholder to be so designed that it can be mounted in a cutting tool in a desired manner.

What is claimed is:

1. A cutting tool comprising:
   an insert having a through hole for receiving a bolt therethrough, the bolt securing the insert on a tool holder;
   a first end of said bolt being shaped with a head for axially arresting the insert on the bolt while said head is seated in a recess formed on the insert, and the other end of the bolt carrying a nut in threaded engagement with the bolt;
   a tool holder, formed on a first side with a seat for receiving the insert and on a second, opposite side formed with a seat for receiving the nut, and a channel connecting said insert seat and said nut seat;
   said channel opening laterally with parallel side walls in a third side connecting said first and opposite sides, the channel forming a slit for laterally introducing the bolt, the insert and the nut being attached thereto, so that the insert is seated on said first side and the nut is seated on said opposite side while the bolt is received in a bottom end of the channel and extended through the channel at a slanting orientation relative to the insert, as the nut is tightened to firmly secure the insert on the tool holder.

2. The cutting tool of claim 1, wherein the bolt is curved so as to be supported by a first wall of said channel upon tightening the nut, and by a second, opposite wall upon loosening the nut.

3. The cutting tool of claim 1, wherein said through hole of the insert has a bevel recess for receiving the bolt head, and wherein said bolt head is formed with a semi spherical surface for circumferentially engaging the bevel in the clamped position.

4. The cutting tool of claim 1, wherein the bolt is curved so as to exert, on the insert, a clamping force having a radial force component.

* * * * *